May 29, 1951
J. E. DEMBENSKI
2,554,526
SANITARY DENTAL FLOSS HOLDER
Filed Nov. 27, 1948
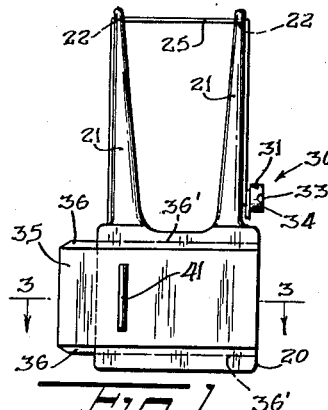
Fig. 1.
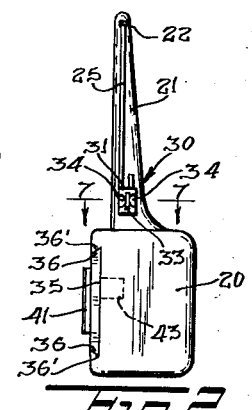
Fig. 2.
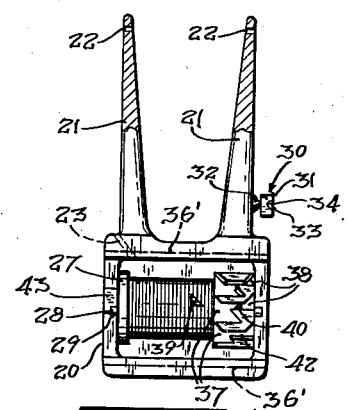
Fig. 4.
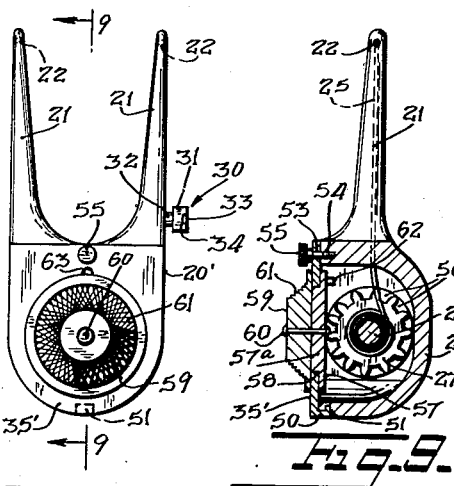
Fig. 8. Fig. 9.
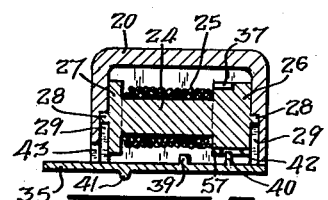
Fig. 3.
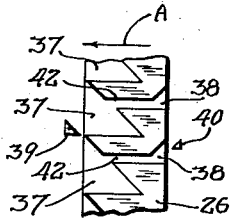
Fig. 6.
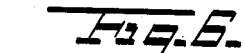
Fig. 11.
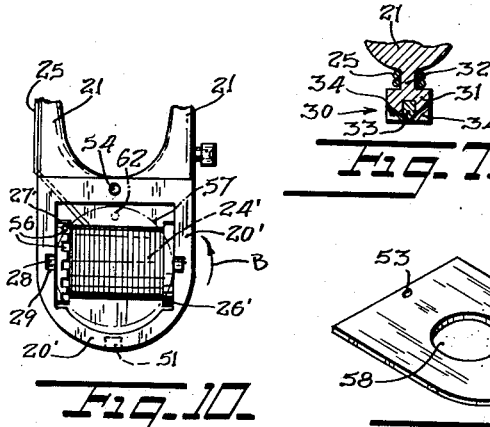
Fig. 10. Fig. 7. Fig. 12.
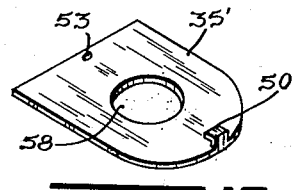
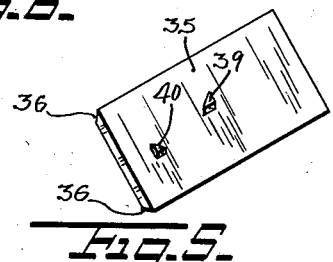
Fig. 5.
INVENTOR.
JOSEPH E. DEMBENSKI
BY
*Zoltan Holachek*
ATTORNEY Patented May 29, 1951

2,554,526

UNITED STATES PATENT OFFICE 2,554,526

SANITARY DENTAL FLOSS HOLDER

Joseph E. Dembenski, Brooklyn, N. Y.

Application November 27, 1948, Serial No. 62,310

10 Claims. (Cl. 132—92)

This invention relates to new and useful improvements in a sanitary dental floss holder and constitutes an improvement in the dental floss holder which forms the subject matter of my earlier U. S. Patent No. 2,381,530, issued on August 7, 1945.

More particularly, the present invention relates to a sanitary dental floss holder characterized by a hollow casing having an open side for enclosing a spool of dental floss and from which a pair of fingers extend in a manner so that the free end of the dental floss may be drawn from the spool and stretched taut between the free ends of the fingers to facilitate its being forced between adjacent teeth of the mouth in the usual manner.

Another object of the present invention proposes the provision of a cover for closing the open side of the casing with means on the cover arranged to cooperate with one of the flanges of the spool to turn the spool in a direction to unwind the dental floss therefrom.

A further object of the present invention proposes providing one of the flanges of the spool of dental floss with rows of ratchet teeth on opposite sides thereof and slidably mounting the cover and providing the inner face of the cover with spaced fixedly mounted pawls disposed on opposite sides of the toothed flange in a manner so that when the cover is slid in one direction one of the pawls will enter the tooth on its respective side of the toothed flange and advance the spool a major portion of the distance between adjacent teeth to unwind the dental floss.

Still further, the present invention proposes so arranging the other fixedly mounted pawl that when the cover is slid in the opposite direction that other pawl will engage a tooth on its respective side of the toothed flange in a manner to advance the spool the remaining minor distance between the adjacent teeth to unwind the dental floss.

Still another object of the present invention proposes continuing the teeth engaged by the other pawl into narrow passages through which the other pawl may pass in a manner to free the cover for complete removal so that a fresh spool of dental floss may be placed within the casing when desired.

Another object of the present invention proposes arranging the cover so that in its inoperative position, the other fixedly mounted pawl will be located in one of the passages to lock the spool against rotation in one direction or the other in a manner to insure that the dental floss will be retained taut while the holder is in operation.

In accordance with a modification of the present invention, it is proposed to fixedly mount the cover in position and provide it with a rotatively mounted pawl arranged to cooperate with teeth formed in one flange of the spool of dental floss to rotate the spool in a direction to unwind the dental floss when the pawl is turned in one direction.

It is a further object of the present invention to construct a sanitary dental floss holder which is simple and durable and which can be manufactured and sold at a reasonable cost, and various other advantages and features will become apparent as this specification proceeds.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a front elevational view of a sanitary dental floss holder constructed in accordance with the present invention.

Fig. 2 is a side elevational view looking from the right side of Fig. 1.

Fig. 3 is a horizontal sectional view taken on the line 3—3 of Fig. 1.

Fig. 4 is a view similar to a portion of Fig. 1 with the cover removed, but showing the relative position of the fixedly mounted pawls as they would appear in the normal inoperative position of the cover.

Fig. 5 is an inside perspective view of the cover, per se.

Fig. 6 is a developed view of a portion of the toothed flange of the spool of dental floss.

Fig. 7 is an enlarged partial horizontal sectional view taken on the line 7—7 of Fig. 2.

Fig. 8 is a view similar to Fig. 1, but illustrating the sanitary dental floss holder constructed in accordance with a modification of the present invention.

Fig. 9 is an enlarged longitudinal sectional view taken on the line 9—9 of Fig. 8.

Fig. 10 is a view similar to a portion of Fig. 8, but with the cover removed.

Fig. 11 is a diagrammatic view illustrating the operation of the dental floss holder shown in Figs. 8 to 10.

Fig. 12 is an inside perspective view of the cover, per se, used in the form of the invention shown in Figs. 8 to 11.

The sanitary dental floss holder, in accordance with the form of the invention shown in Figs. 1 to 7, includes a casing 20 which is preferably hollow and which is molded of a resinous plastic material. The casing 20 has an open front side and has integrally formed therewith a pair of spaced fingers 21. The fingers 21 extend parallel to each other and laterally from the side of the casing 20. The free ends of the fingers 21 are formed with aligned holes 22, see Fig. 4, for the passage of a piece of dental floss.

The side of the casing 20 from which the fingers 21 extend is formed with a passage 23, see Fig. 4, through which the dental floss may pass from the interior to the exterior of the casing 20. The outer end of the passage 23 is located adjacent the outer face of one of the fingers 21 at the base thereof.

Rotatively disposed within the casing 20, there is a spool 24 having wound thereon dental floss 25 between end flanges 26 and 27. The flange 27 is thin, and the flange 26 is somewhat thicker than the flange 27. The flanges 26 and 27 continue into aligned trunnions 28 slidably and rotatively disposed in grooves 29 formed in the inside faces of the opposed end walls of the casing 20. The grooves 29 communicate with the open side of the casing 20 and permit the removal of a used spool 24 and the insertion of a fresh spool of dental floss.

The end of the dental floss 25 on the spool 24 is to be threaded through the passage 23 and passed along the outer face of the adjacent finger 21 to the hole 22 at the outer end thereof. The end of the dental floss 25 is then passed through the hole 22 of that finger 21 and across the space between the adjacent sides of the fingers 21, see Fig. 1, and then through the hole 22 of the other finger 21. The free end of the dental floss 25 is then extended along the outer side of that other finger 21 and secured to a member 30 integrally formed on the outer side of that other finger 21.

The member 30 comprised a block-like portion 31 joined to the side of that other finger 21 by a reduced neck portion 32. The free end of the dental floss 25 after being extended along the outer side of that other finger 21 is then wound around the neck portion 32 of the member 30. By drawing the end of the dental floss tight, after winding it several times about the neck portion 32, a wedging action will be produced which will retain the end securely in position.

Set into the outer face of the block-like portion 31 of the member 30, there is a cutting blade 33 and the block-like portion 31 on opposite sides of the cutting blade is formed with matching concavities 34 which permit the end of the dental floss to be severed off. After the end of the dental floss has been wound several times around the neck portion 32 of the member 30, the projecting end portion is then turned into severing position across the edge of the cutting blade 33, as permitted by the concavities 34, and cut off on the blade.

A cover 35 is provided for closing the open side of the casing 30. The cover 35 is formed on opposite sides with beveled edges 36 which engage complementary grooves 36' formed on the casing 20 on opposite sides thereof. The engagement of the beveled edges 36 with the grooves 36' acts to slidably support the cover 35 for longitudinal movement relative to the casing 20.

The thick flange 26 is formed on its periphery, adjacent the inner side thereof, with a plurality of relatively deep ratchet teeth 37, see Figs. 4 and 6. The flange 26 may be formed with any desired number of ratchet teeth 37, depending upon the distance it is desired to have the spool 24 turned on each movement of the cover 35; however, it is preferred that the flange 26 be formed with at least five teeth 37 so that the spool will rotate one-fifth of a complete revolution for each movement of the cover 35.

The periphery of the thick flange 26, adjacent the outer side thereof, is formed with a plurality of relative shallow ratchet teeth 38, see Figs. 4 and 6. There is one shallow ratchet tooth 38 for each of the deep ratchet teeth 37, and the shallow ratchet teeth are arranged alternately with the deep ratchet teeth 37. As shown on the drawing, the shallow ratchet teeth 38 face in the direction opposite to that in which the deep ratchet teeth 37 face.

The inside face of the cover 35 is formed with a large fixed pawl 39 normally located on the side of the thick flange 26 formed with the deep ratchet teeth 37. A small fixed pawl 40 is also formed on the inside face of the cover 35 and is spaced from the large pawl 39 to be normally located in engagement with one of the shallow teeth 38 when the large pawl 39 is located on the side of the thick flange 26 formed with the deep ratchet teeth 37, see Fig. 4. The front of the cover 35 is formed with a projecting rib 41, see Figs. 1 to 3, upon which a grip may be had for moving the cover 35 longitudinally relative to the casing 20.

The arrangement is such that when the cover 25 is slid to the right, as viewed in Fig. 1, the small pawl 40 will move out of engagement with its respective tooth 38 and the large pawl 39 will move toward and into engagement with its respective large tooth 37. This engagement of the large pawl 39 with the large tooth 37 will act to turn the spool 24 through the major portion of one-fifth of a revolution. When the cover 35 has been moved as far to the right as possible, as limited by the engagement of the large pawl 39 with the base of the large ratchet tooth 37, the cover 35 is then moved to the left, as indicated by the arrow A in Fig. 6, back to its starting position. During such movement to the left, the large pawl 39 moves out of its large tooth 37 and the small pawl 40 enters its respective small ratchet tooth 38. When the large pawl 39 is entirely clear of its large ratchet tooth 37, the small pawl 40 moves into the small ratchet tooth 38 and moves the spool 24 through the remaining minor portion of the one-fifth revolution. Such movement will align the next large ratchet tooth 37 to be engaged by the large pawl 39 on the next movement of the cover 35 to the right, as viewed in Fig. 1.

The base of each small ratchet tooth 38 continues into a passage 42, see Figs. 4 and 6, having a width substantially the same as the small pawl 40 and smaller than the large pawl 39. When the cover is in the normal position shown in Fig. 1, the small pawl 40 will be located in one of the passages 42, as shown in Fig. 4, to hold the spool 24 against rotating. The passages 42 extend through the large ratchet teeth 37 and the side of the casing 20 adjacent the thin flange 27 is formed with a slot 43 of a width to permit the pawls 39 and 40 to pass therethrough when the cover 35 is slid completely to the left, as viewed in Fig. 1. This permits complete disengagement of the cover 35 from the casing 20 freeing the spool 24 to be removed from the casing 20 to be interchanged with a fresh spool.

The operation of the sanitary dental floss holder is as follows:

The holder will appear, when ready for use, as shown in Fig. 1. A portion of the dental floss 25 will be tautly stretched between the ends of the fingers 21 so that portion of the dental floss may be forced between adjacent teeth of the mouth.

When it is desired to renew the portion of the dental floss 25 between the ends of the fingers 21, the rib 41 on the face of the cover 35 is gripped and the cover is first moved to the right and then to the left back to its starting position, as the cover is viewed in Fig. 1. Such movement of the cover 35 will cause the pawls 39 and 40 to act successively upon the ratchet teeth 37 and 38 on the thick flange 26 of the spool 24, and rotate the spool through a one-fifth revolution, which will unwind some of the dental floss 25 from the spool 24. The end of the dental floss 25 is then unwound from the member 30 and pulled tight and rewound about the member 30. During the pulling of the dental floss 25, the spool will be held against rotation by the engagement of the small pawl 40 in the small ratchet tooth 38 or the respective passage 42 thereof. After being twisted about the member 30, the end of the length of dental floss is then drawn across the cutting blade 33 severing the projecting end of the dental floss therefrom.

In the modification of the invention shown in Figs. 8 to 12, the construction of the sanitary dental floss holder is similar to that previously described, but differing in the means for rotating the spool 24' to unwind the dental floss 25 therefrom.

In this modification of the invention, the cover 35' is fixedly but removably mounted on the casing 20'. Along one edge, the cover 35' is formed with an inwardly directed bead 50, see Figs. 9 and 12, arranged to be received in a complementary groove 51 formed in the casing 20'. The opposite side of the cover 35' is formed with a hole 53 aligned with a threaded opening 54 formed in the casing 20', see Fig. 9. A thumb screw 55 passes through the hole 53 and threadedly engages the opening 54 to retain the cover 35' in position. The thumb screw 55 can be removed to free the cover 35' to be removed so that the spool 24' can be removed to be interchanged with a fresh spool of dental floss.

The flanges 26' and 27' of the spool 24', in this modification of the invention are substantially the same thickness, and the inside face of the flange 27' is formed with small substantially V-shaped teeth 56. The teeth 56 open to the periphery of the flange 27'.

Means is provided on the cover 35' to cooperate with the teeth 56 to rotate the spool 24' in a direction to unwind the dental floss 25. This means comprises a circular plate 57 formed on one side thereof with a concentric hub portion 57ᵃ rotatively received in a complementary hole 58, see Figs. 9 and 12, formed in the cover 35'. Disposed adjacent the outer face of the cover 35' there is a disc 59 fixedly secured to the circular plate 57 by means of a single rivet 60, so that when the disc 59 is rotated the circular plate 57 will rotate therewith. The exposed face of the disc 60 is provided with knurling 61 by which the disc 60 can be rotated to similarly rotate the plate 57.

The inside face of the circular plate 57 is provided with an eccentrically mounted pawl 62 arranged to move into and out of one of the teeth 56 of the flange 27', as the plate 57 is turned in the direction of the arrow B on Fig. 10, to turn the spool 24' in a direction to unwind the dental floss 25. In Fig. 11, the dot and dash lines 62' illustrate the pawl 62 entering one of the V-shaped teeth 56, the full lines illustrate the pawl 62 fully in position in the tooth 56 and the dot and dash lines 62'' illustrate the pawl 62 leaving the tooth 56 after having rotated the spool 24' to unwind a portion of the dental floss 25.

A small indicator 63 extends radially from the side of the disc 59, see Fig. 8. The indicator 63 is arranged in alignment with the pawl 62 to indicate the rotative position of the pawl within the casing 20'.

The operation of the sanitary dental floss holder of this form of the invention is similar to that described in connection with the previous form of the invention. Friction of the trunnions 28 of the spool 24' in the grooves 29 is depended upon to hold the spool 24' against rotating when the dental floss 25 is being pulled.

In other respects this form of the invention is similar to that previously described, and like reference numerals identify like parts in each of the several views.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new and desire to secure by United States Letters Patent is:

1. A dental floss holder comprising a hollow casing for a spool of dental floss open on one side, a pair of spaced fingers projecting from one side of said casing and formed at their free ends with aligned holes, a spool of dental floss rotatively supported within said casing and having end flanges, said casing being formed with a passage leading from the interior thereof to the base of one of said fingers on the outer side thereof, a member formed on the outer side of the other of said fingers to which the free end of a length of dental floss may be secured after being drawn from said spool, passing through said passage, extending along the outer side of said one finger, passing through said aligned holes and extending along the outer side of said other finger, a removable cover closing the open side of said casing, and means on said cover cooperative with one of said end flanges of said spool of dental floss for rotating said spool in a direction to unwind the dental floss thereon, said means comprising a pawl carried by said cover and engageable with complementary teeth formed on said one end flange of said spool for rotating the same when said pawl moves into engagement with said teeth.

2. A dental floss holder comprising a hollow casing for a spool of dental floss open on one side, a pair of spaced fingers projecting from one side of said casing and formed at their free ends with aligned holes, a spool of dental floss rotatively supported within said casing and having end flanges, said casing being formed with a passage leading from the interior thereof to the base of one of said fingers on the outer side thereof, a member formed on the outer side of the other of said fingers to which the free end of a length of dental floss may be secured after being drawn from said spool, passing through said passage, extending along the outer side of said one finger, passing through said aligned holes and extending along the outer side of said other finger, a removable cover closing the open side of said casing, means on said cover cooperative with one of said end flanges of said spool of dental floss for rotating said spool in a direction to unwind the dental floss thereon, said cover being mounted for longitudinal sliding movement, teeth formed along opposite sides of said one flange, and pawls formed on the inside face of said cover disposed on opposite sides to said one flange to engage said teeth, said cover being first slid in one direction and then in the other to turn the spool a distance equal to the space between certain of the teeth.

3. A dental floss holder comprising a hollow casing for a spool of dental floss open on one side, a pair of spaced fingers projecting from one side of said casing and formed at their free ends with aligned holes, a spool of dental floss rotatively supported within said casing and having end flanges, said casing being formed with a passage leading from the interior thereof to the base of one of said fingers on the outer side thereof, a member formed on the outer side of the other of said fingers to which the free end of a length of dental floss may be secured after being drawn from said spool, passing through said passage, extending along the outer side of said one finger, passing through said aligned holes and extending along the outer side of said other finger, a removable cover closing the open side of said casing, means on said cover cooperative with one of said end flanges of said spool of dental floss for rotating said spool in a direction to unwind the dental floss thereon, said cover being mounted for longitudinal sliding movement, teeth formed along opposite sides of said one flange, and pawls formed on the inside face of said cover disposed on opposite sides to said one flange to engage said teeth, said cover being first slid in one direction and then in the other to turn the spool a distance equal to the space between certain of said teeth continuing at their bases into passages through which the respective pawl may be moved to free the cover for complete removal from said casing.

4. A dental floss holder comprising a hollow casing for a spool of dental floss open on one side, a pair of spaced fingers projecting from one side of said casing and formed at their free ends with aligned holes, a spool of dental floss rotatively supported within said casing and having end flanges, said casing being formed with a passage leading from the interior thereof to the base of one of said fingers on the outer side thereof, a member formed on the outer side of the other of said fingers to which the free end of a length of dental floss may be secured after being drawn from said spool, passing through said passage, extending along the outer side of said one finger, passing through said aligned holes and extending along the outer side of said other finger, a removable cover closing the open side of said casing, means on said cover cooperative with one of said end flanges of said spool of dental floss for rotating said spool in a direction to unwind the dental floss thereon, said cover being mounted for longitudinal sliding movement, teeth formed along opposite sides of said one flange, and pawls formed on the inside face of said cover disposed on opposite sides to said one flange to engage said teeth, said cover being first slid in one direction and then in the other to turn the spool a distance equal to the space between certain of the teeth, certain of said teeth continuing at their bases into passages through which the respective pawl may be moved to free the cover for complete removal from said casing, one of the walls of said casing beneath said cover being formed with a slot through which said pawls may pass when disengaging said cover from said casing.

5. A dental floss holder comprising a hollow casing for a spool of dental floss open on one side, a pair of spaced fingers projecting from one side of said casing and formed at their free ends with aligned holes, a spool of dental floss rotatively supported within said casing and having end flanges, said casing being formed with a passage leading from the interior thereof to the base of one of said fingers on the outer side thereof, a member formed on the outer side of the other of said fingers to which the free end of a length of dental floss may be secured after being drawn from said spool, passing through said passage, extending along the outer side of said one finger, passing through said aligned holes and extending along the outer side of said other finger, a removable cover closing the open side of said casing, means on said cover cooperative with one of said end flanges of said spool of dental floss for rotating said spool in a direction to unwind the dental floss thereon, said cover being mounted for longitudinal sliding movement, teeth formed along opposite sides of said one flange, pawls formed on the inside face of said cover disposed on opposite sides to said one flange to engage said teeth, said cover being first slid in one direction and then in the other to turn the spool a distance equal to the space between certain of the teeth, and a rib formed on the outer face of said cover by which it may be slid relative to said casing.

6. A dental floss holder comprising a hollow casing for a spool of dental floss open on one side, a pair of spaced fingers projecting from one side of said casing and formed at their free ends with aligned holes, a spool of dental floss rotatively supported within said casing and having end flanges, said casing being formed with a passage leading from the interior thereof to the base of one of said fingers on the outer side thereof, a member formed on the outer side of the other of said fingers to which the free end of a length of dental floss may be secured after being drawn from said spool, passing through said passage, extending along the outer side of said one finger, passing through said aligned holes and extending along the outer side of said other finger, a removable cover closing the open side of said casing, and means on said cover cooperative with one of said end flanges of said spool of dental floss for rotating said spool in a direction to unwind the dental floss thereon, said removable mounting of said cover comprising a bead formed along one edge of said cover, said casing being formed with a complementary groove engaged by said bead, said cover being formed on its opposite side with a hole, said casing being formed with a threaded opening aligned with said hole, and a thumb screw passing through said hole and engaging said threaded opening.

7. A dental floss holder comprising a hollow casing for a spool of dental floss open on one side, a pair of spaced fingers projecting from one side of said casing and formed at their free ends with aligned holes, a spool of dental floss rotatively supported within said casing and having end flanges, said casing being formed with a passage leading from the interior thereof to the base of one of said fingers on the outer side thereof, a member formed on the outer side of the other of said fingers to which the free end of a length of dental floss may be secured after being drawn from said spool, passing through said passage, extending along the outer side of said one finger, passing through said aligned holes, and extending along the outer side of said other finger, a removable cover closing the open side of said casing, and means on said cover cooperative with one of said end flanges of said spool of dental floss for rotating said spool in a direction to unwind the dental floss thereon, said means comprising a plate having a hub portion rotatively engaging a hole in said cover, V-shaped teeth formed on the inner face of said one flange of said spool, a pawl eccentrically mounted on the inner face of said plate to engage said teeth and turn said spool when said plate is turned, and means for turning said plate.

8. A dental floss holder comprising a hollow casing for a spool of dental floss open on one side, a pair of spaced fingers projecting from one side of said casing and formed at their free ends with aligned holes, a spool of dental floss rotatively supported within said casing and having end flanges, said casing being formed with a passage leading from the interior thereof to the base of one of said fingers on the outer side thereof, a member formed on the outer side of the other of said fingers to which the free end of a length of dental floss may be secured after being drawn from said pool, passing through said passage, extending along the outer side of said one finger, passing through said aligned holes and extending along the outer side of said other finger, a removable cover closing the open side of said casing, and means on said cover cooperative with one of said end flanges of said spool of dental floss for rotating said spool in a direction to unwind the dental floss thereon, said means comprising a plate having a hub portion rotatively engaging a hole in said cover, V-shaped teeth formed on the inner face of said one flange of said spool, a pawl eccentrically mounted on the inner face of said plate to engage said teeth and turn said spool when said plate is turned, and means for turning said plate, said plate turning means comprising a disc secured to said plate and disposed on the outer face of said cover.

9. A dental floss holder comprising a hollow casing for a spool of dental floss open on one side, a pair of spaced fingers projecting from one side of said casing and formed at their free ends with aligned holes, a spool of dental floss rotatively supported within said casing and having end flanges, said casing being formed with a passage leading from the interior thereof to the base of one of said fingers on the outer side thereof, a member formed on the outer side of the other of said fingers to which the free end of a length of dental floss may be secured after being drawn from said spool, passing through said passage, extending along the outer side of said one finger, passing through said aligned holes and extending along the outer side of said other finger, a removable cover closing the open side of said casing, and means on said cover cooperative with one of said end flanges of said spool of dental floss for rotating said spool in a direction to unwind the dental floss thereon, said means comprising a plate having a hub portion rotatively engaging a hole in said cover, V-shaped teeth formed on the inner face of said one flange of said spool, a pawl eccentrically mounted on the inner face of said plate to engage said teeth and turn said spool when said plate is turned, and means for turning said plate, said plate turning means comprising a disc secured to said plate and disposed on the outer face of said cover, said disc having its outer face knurled providing a grip for turning the same.

10. A dental floss holder comprising a hollow casing for a spool of dental floss open on one side, a pair of spaced fingers projecting from one side of said casing and formed at their free ends with aligned holes, a spool of dental floss rotatively supported within said casing and having end flanges, said casing being formed with a passage leading from the interior thereof to the base of one of said fingers on the outer side thereof, a member formed on the outer side of the other of said fingers to which the free end of a length of dental floss may be secured after being drawn from said spool, passing through said passage, extending along the outer side of said one finger, passing through said aligned holes and extending along the outer side of said other finger, a removable cover closing the open side of said casing, and means on said cover cooperative with one of said end flanges of said spool of dental floss for rotating said spool in a direction to unwind the dental floss thereon, said means comprising a plate having a hub portion rotatively engaging a hole in said cover, V-shaped teeth formed on the inner face of said one flange of said spool, a pawl eccentrically mounted on the inner face of said plate to engage said teeth and turn said spool when said plate is turned, and means for turning said plate, said plate turning means comprising a disc secured to said plate and disposed on the outer face of said cover, and an indicator extended radially from the side of said disc in alignment with said pawl to indicate the position of said pawl within said casing.

JOSEPH E. DEMBENSKI.

REFERENCES CITED

The following references are of record in the file of this patent:

UNITED STATES PATENTS

| Number | Name | Date |
| --- | --- | --- |
| 618,009 | La Varre | Jan. 17, 1899 |
| 754,841 | Bessonet | Mar. 15, 1904 |
| 1,952,358 | Bohm | Mar. 27, 1934 |

FOREIGN PATENTS

| Number | Country | Date |
| --- | --- | --- |
| 215,691 | Great Britain | May 15, 1924 |